US005506575A

United States Patent [19]

Ormos

[11] Patent Number: 5,506,575

[45] Date of Patent: Apr. 9, 1996

[54] KEY-LOCK SYSTEM AND METHOD USING INTERCHANGE OF SYSTEM-ORIGINATED CODES

[76] Inventor: Zoltan S. Ormos, P.O. Box (P.F.) 229, Sopron, Hungary, H-9401

[21] Appl. No.: 163,577

[22] Filed: Dec. 7, 1993

Related U.S. Application Data

[63] Continuation of Ser. No. 765,552, Sep. 25, 1991, abandoned.

[51] Int. Cl.[6] .......... H04Q 1/00

[52] U.S. Cl. .......... 340/825.31; 340/825.34; 340/825.54; 70/278; 235/382.5

[58] Field of Search .......... 340/825.31, 825.32, 340/825.34, 825.3, 825.54, 825.69, 825.72; 361/171, 172; 70/278, 418, 383; 235/382, 382.5; 455/41; 307/10.5

[56] References Cited

U.S. PATENT DOCUMENTS

| | | | |
|---|---|---|---|
| 4,509,093 | 4/1985 | Stellberger | 340/825.31 |
| 4,519,228 | 5/1985 | Sornes | 235/382.5 |
| 4,727,368 | 2/1988 | Larson et al. | 340/825.31 |
| 4,766,746 | 8/1988 | Henderson et al. | 340/825.31 |
| 4,779,090 | 10/1988 | Micznik et al. | 340/825.31 |
| 4,791,280 | 12/1988 | O'Connell et al. | 70/278 |
| 4,829,296 | 5/1989 | Clark et al. | 340/825.31 |
| 4,992,785 | 2/1991 | Lewiner et al. | 70/278 |
| 5,068,894 | 11/1991 | Hoppe | 340/825.31 |
| 5,204,663 | 4/1993 | Lee | 340/825.31 |
| 5,252,965 | 10/1993 | Gidwani et al. | 340/825.31 |

*Primary Examiner*—John K. Peng
*Assistant Examiner*—Andrew Hill
*Attorney, Agent, or Firm*—Kenneth P. Robinson

[57] ABSTRACT

An inter-active key-lock system uses an unlock sequence in which messages exchanged between the key and lock include class-codes and unique-codes as parts of such messages. Dynamic indicators or labels are also stored in the lock memory for control purposes. These labels include "authorities" which indicate whether a key is able to make another key for the same lock or able to deactivate keys from use with the lock, and "parents" which indicate which parent key was used to make an additional key. The system enables an individual lock owner to code a key and control coding of additional keys on an exclusive basis, with the feature that there is no master-key and no emergency code available to the manufacturer or usable by any authorized service representative to unlock the lock.

16 Claims, 3 Drawing Sheets

KEY-LOCK SYSTEM AND METHOD USING INTERCHANGE OF SYSTEM-ORIGINATED CODES

This is a continuation of application(s) Ser. No. 07/765,552 filed on Sep. 25, 1991, abandoned.

BACKGROUND OF THE INVENTION

In the highly sophisticated art of modern key-lock systems multiple independent locks can be operated by one or more independent keys and multiple independent keys can operate the same lock. These systems are based on two way communication between keys and locks. The release operation of the lock depends on the coincidence between the key-code transmitted by the key and the release-code stored in the lock.

For security reasons the key-code gets transmitted only upon receiving a trigger-code from the lock. In order to further enhance security these transmitted codes get scrambled or changed after each use.

The problem of establishing and reorganizing key-lock assignments in an easy and flexible way, without restricting the security of systems, is not satisfactorily solved yet.

SUMMARY OF THE INVENTION

The purpose of this invention is to provide a very easy to use, flexible, comfortable yet highly secure closure/controller system. It can solve all of the currently known key-lock related problems (e.g., assigning a key to a lock, allowing a lock to be operated by many independent keys and making security copies) and the owner of the lock can replace and disable the lost keys to the lock as well as disable (prohibit) any absent keys and their copies without the notice or approval of the owners of such copies. Only the key's owner is able to make a copy of the key.

A new feature of the system is that there is no master-key and no emergency-code usable by the manufacturer or by its authorized representatives to unlock a closure. The only authorized person for a lock is its owner him/herself.

According to the invention, the new features are achieved by using class-codes and unique-codes as parts of the messages between the lock and the key, as well as dynamic indicators or labels for the proper keys in the lock's memory.

These indicators or labels are:

authorities, indicating whether a key is able to make another key (subsequently inserted in the same lock) usable with, or deactivated from use with, that lock; and parents, indicating which one of the authority possessing keys made a key proper for use in the lock.

More particularly, a key-lock system in accordance with the invention includes a key for communicating with locks via messages consisting of a class-code part and a unique-code part. Such a key comprises:

a state register for storing states of the key, a timer for timing such states of the key and for resetting the state register after expiration of a state of the key, a starter for initiating the operation of the key, a memory for storing—

(1) the actual identifier of the key, (2) the actual copy-code of the key, (3) questions for comparison to the unique-code part of a question-to-answer class of messages received, and (4) answers, individually associated with such questions, to be used as the unique-code part of an answer-to-question class of messages to be sent,and a read-only memory for storing an original identifier and copy-code, determined by the manufacturer, to replace the actual identifier and actual copy-code in case of a reset of the key.

The key further includes:

a comparator for comparing the unique-code part of messages received to such questions, a class-code generator for generating the class-code part of messages to be sent, a unique-code generator for generating the unique-code part of messages to be sent, a class-code analyzer for identifying the class of messages received, a unique-code analyzer for identifying the unique-code part of messages received, a transmitter for transmitting messages, a receiver for receiving messages, temporary registers for temporary storage of messages to be sent and of messages received, a linker for linking the transmitter and receiver to locks, and an algorithm processor to organize the operation of the key including functions of the states of the key, the class-code part of messages received, the output signal of the comparator and the signal from the starter.

The key-lock system in accordance with the invention also includes a lock for communicating with keys via messages consisting of a class-code part and a unique-code part. Such a lock comprises:

a state register for storing states of the lock, a timer for timing such states of the lock and for resetting the state register after expiration of a state of the lock, a reset button for initiating a reset operation of the lock, and a memory for storing—

(1) identifiers of keys assigned in the lock, (2) questions, individually associated with such identifiers, to be sent as the unique-code part of a question-to-answer class of messages, (3) answers individually associated with questions to be expected as the unique-code part of an answer-for-question class of messages received from the key having such associated identifier, (4) authority indicators, individually associated with such identifiers, for indicating if the key has the power to assign other keys to the lock and, if it does, which level of authority the other keys will have, and (5) parent indicators, individually associated with such identifiers, for indicating the higher authorized key which assigned the key to the lock.

The lock further includes:

a comparator for comparing the unique-code part of a message received to such identifiers and answers, a class-code generator for generating the class-code part of messages to be sent, a unique-code generator for generating the unique-code part of messages to be sent, a class-code analyzer for identifying the class of messages received, a unique-code analyzer for identifying the unique-code part of messages received, a transmitter for transmitting messages, a receiver for receiving messages, temporary registers for temporary storage of messages to be sent and messages received, a linker for linking the transmitter and receiver to keys, an algorithm processor to organize the operation of the lock including functions of the states of the lock, the class-code part of messages received, the output signal of the comparator and the signal coming from the reset button, and a lock driver, controlling unlock/lock operation, activated by the algorithm processor in the case of coincidence between the unique-code part of an answer-to-question class message, received during the waiting-for-answer state of the lock, and an answer stored in the memory of the lock in association with the question which forms the unique-code part of the message last transmitted from the lock.

BRIEF DESCRIPTION OF THE DRAWINGS

In order to better clarify the essential characteristics of the invention, an exemplifying form of a practical embodiment thereof is now described, with reference to the attached drawings, wherein.

Figure 1:
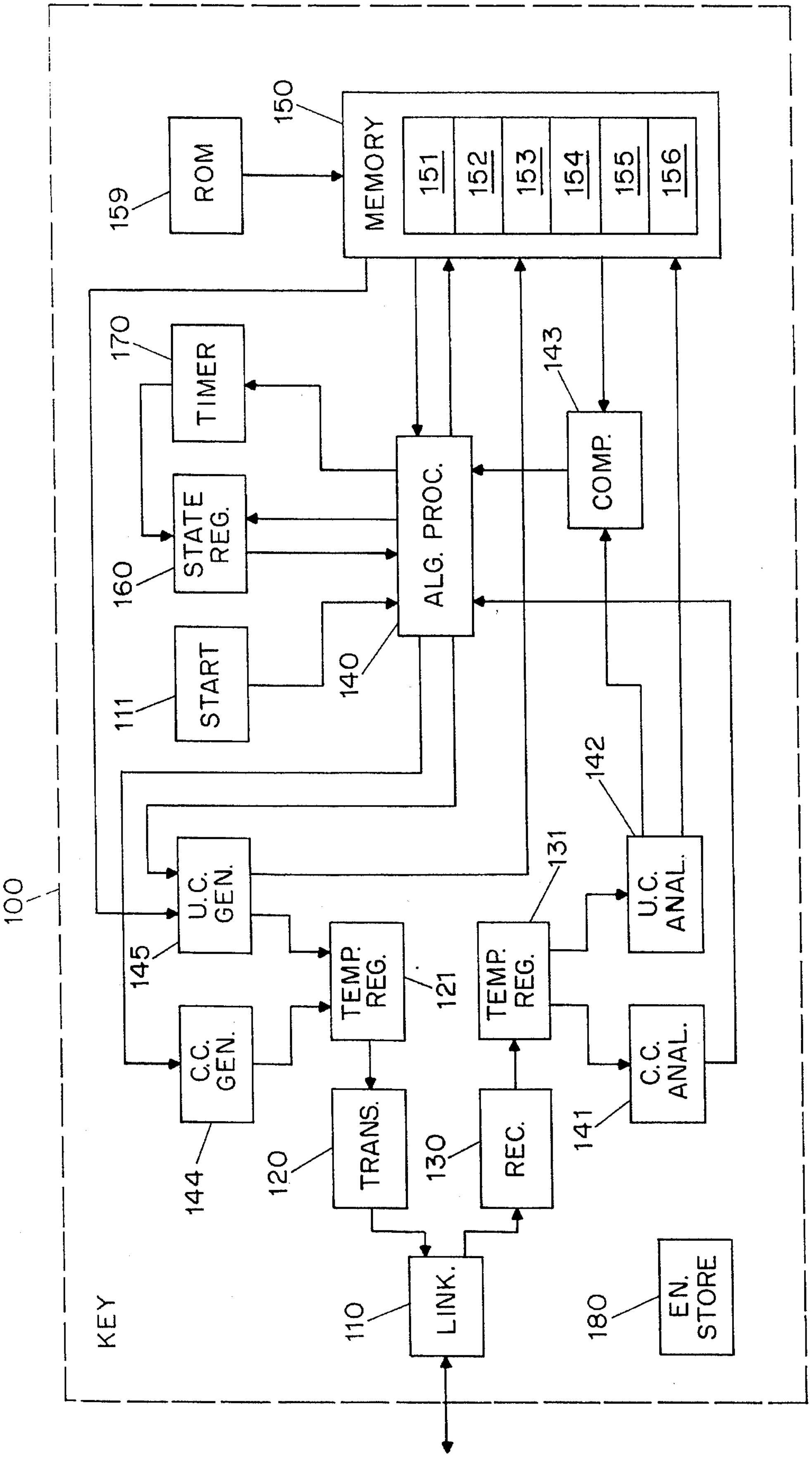
FIG. 1 shows a functional block diagram of a key and FIG. 2 shows a functional block diagram of a lock.

The references used on FIGS. 1 and 2 of the drawings are identified as follows:

(A) the key 100, as shown in FIG. 1, includes:

| | | | |
|---|---|---|---|
| 111 | starter | 180 | energy storage |
| 110 | linker | 130 | receiver |
| 120 | transmitter | 131 | temporary register |
| 121 | temporary register | 141 | class-code analyzer |
| 144 | class-code generator | 142 | unique-code analyzer |
| 145 | unique-code generator | 143 | comparator |
| 140 | algorithm processor | 170 | timer |
| 160 | state register | 159 | read-only memory (ROM) |
| 150 | memory | | |

The content of the memory 150:

| | | | |
|---|---|---|---|
| 151 | actual identifier | 154 | answers |
| 152 | actual copy-code | 155 | scrambling codes |
| 153 | questions | 156 | intermediate data |

Figure 2:
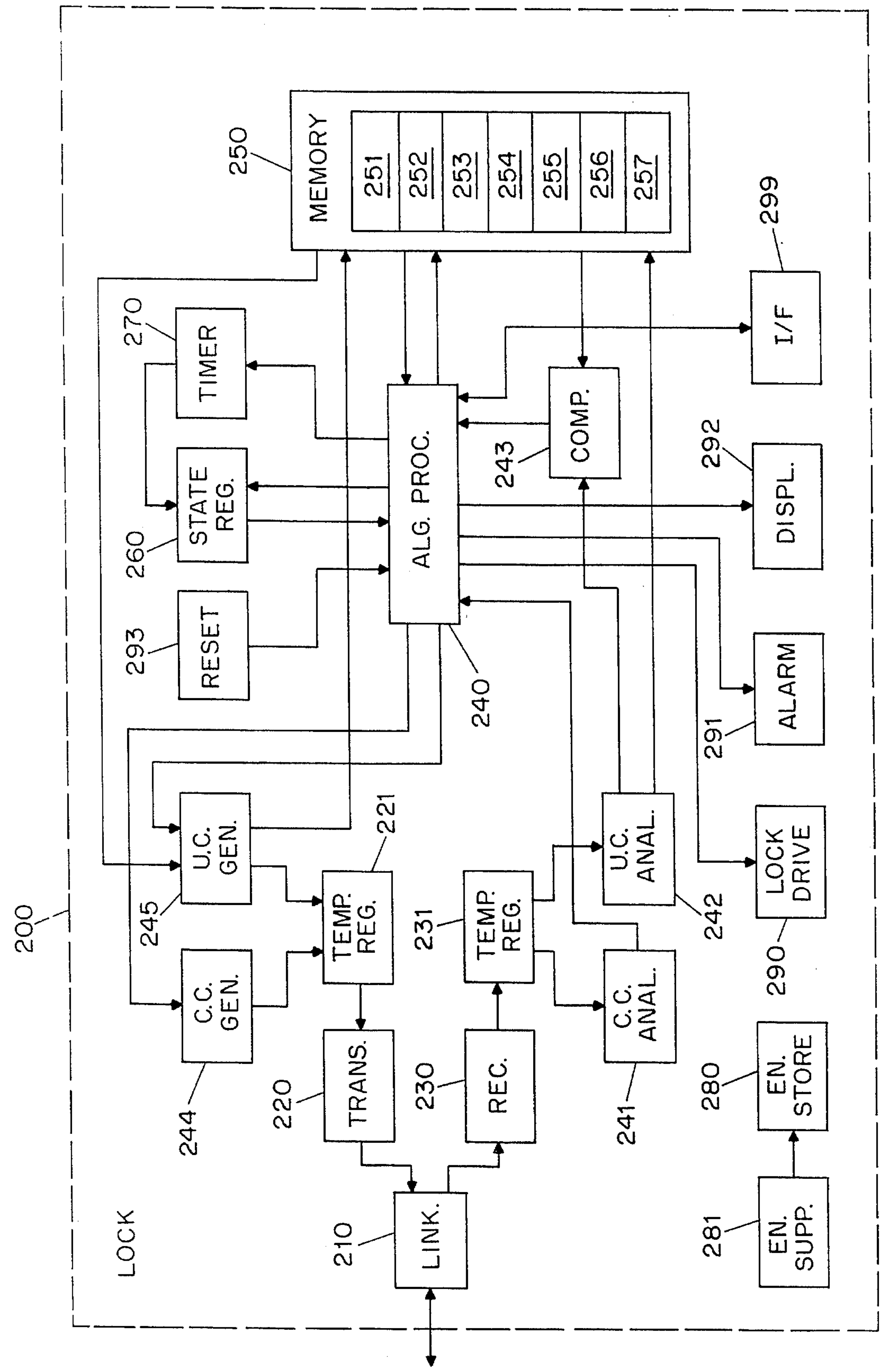

(B) the lock 200, as shown in FIG. 2 includes:

| | | | |
|---|---|---|---|
| 210 | linker | 241 | class-code analyzer |
| 220 | transmitter | 242 | unique-code analyzer |
| 221 | temporary register | 243 | comparator |
| 244 | class-code generator | 270 | timer |
| 245 | unique-code generator | 281 | energy supply |
| 240 | algorithm processor | 290 | lock driver |
| 260 | state register | 291 | alarm |
| 250 | memory | 292 | optical and/or acoustic display |
| 280 | energy storage | | |
| 230 | receiver | 293 | reset button/keyboard |
| 231 | temporary register | 299 | computer interface |

The content of the memory 250:

| | | | |
|---|---|---|---|
| 251 | key identifiers | 255 | parents of keys |
| 252 | questions | 256 | scrambling codes |
| 253 | answers | 257 | intermediate data |
| 254 | authorities of keys | | |

DETAILED DESCRIPTION OF THE PREFERRED EMBODIMENT

In the drawings a lock is indicated in FIG. 1 by 200 and the related key is indicated in FIG. 2 by 100.

The key 100 and the lock 200 are connected through linkers 110, 210. The linkers are interconnected in any preferred wired or wireless way. Both key and lock are able to send and receive messages consisting of a class-code part and a unique-code part via transmitters 120, 220 and receivers 130, 230.

Activating the starter 111 causes the algorithm processor 140 to check the state register 160 to determine whether the key 100 is in a "blocked" state. If it is not, then the algorithm processor 140 causes the class-code generator 144 and the unique-code generator 145 to generate into the temporary register 121 a "key-identifier" message. This message, sent by the transmitter 120, comprises the actual identifier 151 stored in the memory 150. After sending the key-identifier message the algorithm processor 140 sets the state register 160 in a "waiting-for-question" state. This state changes into blocked one unless it receives an acceptable valid message within a certain period of time as timed by timer 170. The blocked state is transitional and conditional as well and is also timed by the timer 170.

The receiver 230 in the lock 200 (assumed now to be empty or reset) delivers the received message into the temporary register 231. The class-code analyzer 241 having analyzed the content of the temporary register informs the algorithm processor 240 that a key-identifier message is received. The algorithm processor 240 sensing that the memory 250 does not contain key related data, causes the class-code generator 244 and the unique-code generator 245 to produce (into the temporary register 221) a "question-to-store" message to be sent by the transmitter 220 through the linker 210 to the key 100. The algorithm processor 240 sets the state register 260 into a "waiting-for-acknowledgement" state and saves the unique-code part of the received key-identifier message and the unique-code part of the transmitted question-to-store message as intermediate data 257 into the memory 250.

The key 100 receiving the question-to-store message (temporarily stored in the temporary register 131, analyzed by the class-code analyzer 141 and the unique-code analyzer 142) as an acceptable valid message in its waiting-for-question state, checks with the aid of its comparator 143 the memory 150 to determine whether there is a conflict between the question 153 stored in the memory 150 and the unique-code part of the received question-to-store message. If there is no conflict, the key then sends to the lock 200 an "acknowledge" message and saves the unique-code part as intermediate data 156 into the memory 150; if there is a conflict, the key then sends a "question-conflict" message to the lock 200.

The lock 200 receiving the acknowledge message generates and sends to the key 100 an "answer-to-store" message whose unique-code part, upon receiving the next acknowledge message from the key 100, will be stored into the memories 150 and 250 as an answer at 154 and 253. At the same time the unique-code part of the question-to-store message, previously saved in 250 will be stored in the memories 150 and 250, as questions at 153 and 252. The saved unique-code part of the key-identifier message, stored as identifier 251, as well as a "main-key" authority 254 and a "0" parent 255 assignment, will be stored as identifiers or labels in the memory 250 of the lock 200, linked to the question 252 and to the answer 253.

In case of receiving a question-conflict message the lock generates and sends a new question-to-store message with a different unique-code part repeatedly until receiving an acknowledge message.

Upon operating the key 100, which thus became the main-key, in the same lock 200, the key 100 sends to the lock 200 the key-identifier message, the lock 200 extracts the unique-code part of it with the help of the unique analyzer 242 to use as an identifier 251 and sends the stored question 252 as the unique-code part of a "question-to-answer" message to the key 100. The key then answers with an "answer-to-question" message by recalling and employing the stored answer 154 as a unique-code part. The lock 200 compares the stored answer 253 to the unique-code part of the received answer-to-question message with the help of the comparator 243. Finding them identical, the lock driver 290 will be operated to unlock. Since the authority 254 of the used key 100 is main-key, the algorithm processor 240 sets the state register 260 into the "assigning" state, in which (until the time-off timed by the timer 270) the subsequently used key will be assigned in the lock the same way as the main-key was, except that the authority indicator 254 stored in the memory 250 will indicate "sub-main-key" which is a level lower than the parent-key's authority. In the lock a parent indicator 255 will indicate the key's parental origin.

The keys having the sub-main-key authority are also able to assign new keys of "ordinary authority" to the lock allowing them to operate the lock driver 290 but not to change other key's assignments.

Operating a main-key or a sub-main-key again during the assigning state of a lock, the lock's state will be changed into the "prohibiting" state in which (till the time-off) the subsequently used (e.g., lower authorized) key and associated child-keys are disabled by deleting the related data from the lock's memory.

Using an improper key causes an alarm signal initiated by the algorithm processor 240 activating the alarm 291.

The states of the lock 200 can be displayed by the optical and/or acoustic display 292 and the empty state or reset of the lock can be enforced through the reset button/keyboard 293 which is mechanically closed or hidden. Using a keyboard instead of reset button provides the user with the possibility of feeding a copy-code (stored in the memory 150 of the key 100 as actual copy-code 152) and any new copy-code into the lock enabling it to serve as a household copy device. The copying process is also based on messages between the lock 200 and the key 100. It comprises the actual copy-code 152, the new copy-code for replacing the actual one, both fed into the lock 200 through the keyboard 293, and the copied keys identifier for replacing the actual one in the copy. Without knowing the copy-code it is impossible to make an unauthorized copy of a key due to the high number of possible copy-codes and the self-blocking of the keys when receiving a false code.

For the purpose of resetting a key into the original state (as per manufacturer) the key 100 comprises a read-only memory 159 for storing the original or reference identifier and the original or reference copy-code for replacing the actual identifier 151 and the actual copy-code 152 in the memory 150.

The computer interface 299 is optional for larger applications (e.g., in hotels or offices). There it can be useful to record use of locks or to make restrictions of the time interval for operating the locks or setting conditions for their use. These features are available either independently in each lock or in a centrally controlled system which is linked to the locks by the computer interfaces 299 of the locks. In addition this interface can be used for highly sophisticated key management processing of names and other data related to the keys.

This system was primarily designed to be used by the public in homes, offices, cars, cupboards, safes, etc. However, its unique features make it especially advantageous for official or business use where it is desirable to provide variable (different from one another) and changeable access for each person.

If it is necessary, the key comprises energy storage 180 to supply the key. The lock comprises energy storage 280 and energy supply 281 for recharging the energy storage.

For security reasons the unique-code part of messages can be scrambled by the unique-code generators 145, 245 and descrambled by the unique-code analyzers 142, 242 using the scrambling codes 155, 256 stored in memories 150, 250.

Figure 3:
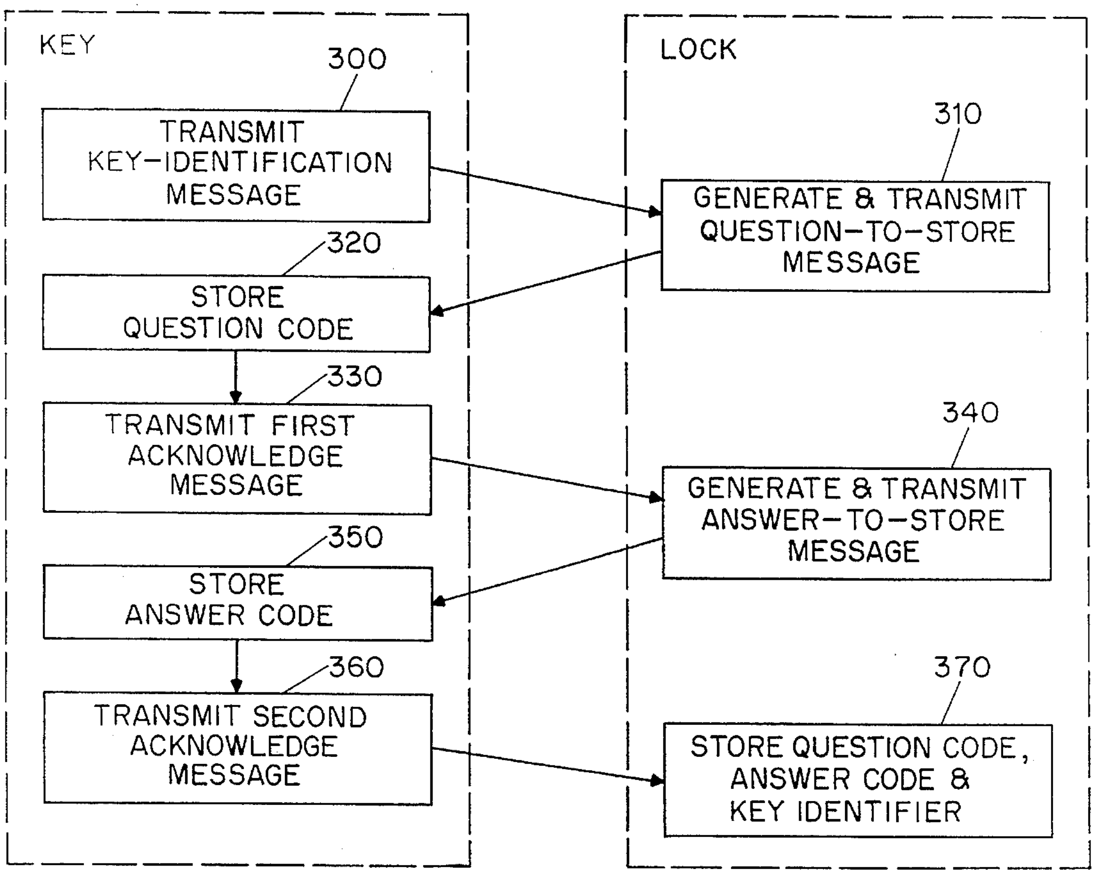
FIG. 3 is a flow chart useful in describing the coding of a key in accordance with the invention and FIG. 4 is a flow chart more particularly useful in describing operation of a key-lock system in accordance with the invention.

In accordance with the preceding description, an embodiment of a method for coding a key for use in a key-lock system, as illustrated in FIG. 3, comprises the following steps:

(a) at step 300, transmitting a key-identification message, including a key-identifier, from the key to the lock;

(b) at step 310, generating and transmitting from the lock to the key a question-to-store message, including a question code;

(c) at step 320, storing in the key the question code transmitted by the lock in step 310;

(d) at step 330, transmitting from the key to the lock a first acknowledge message;

(e) at step 340, generating and transmitting from the lock to the key an answer-to-store message, including an answer code;

(f) at step 350, storing in the key the answer code transmitted by the lock in step 340;

(g) at step 360, transmitting from the key to the lock a second acknowledge message; and (h) at step 370, causing the question code and the answer code to be stored in the lock and identified with such key.

Figure 4:
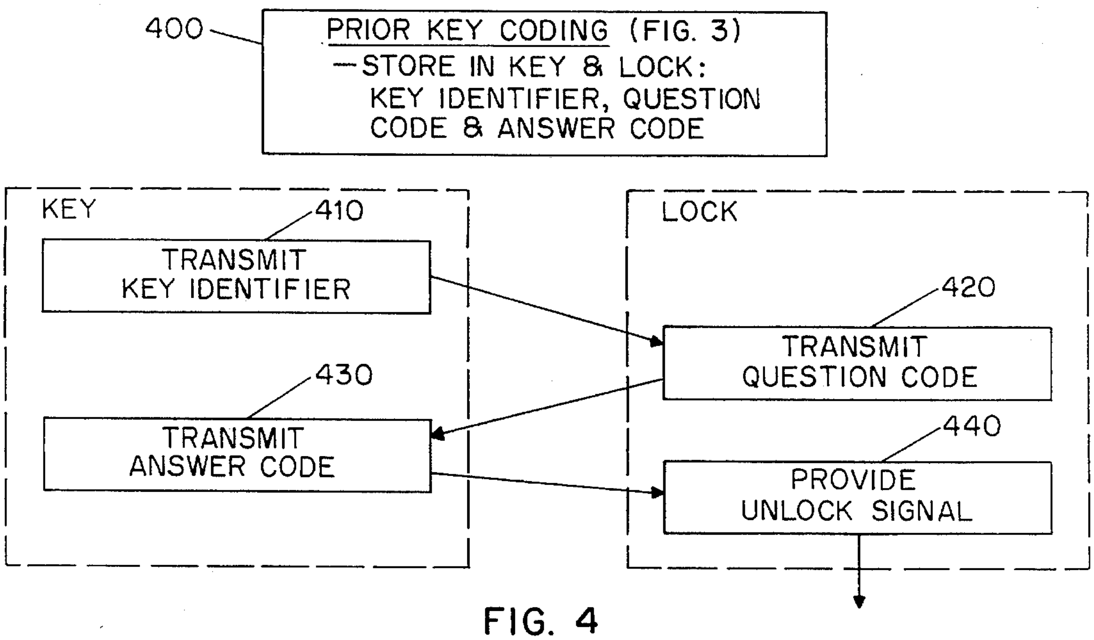

As illustrated in FIG. 4, an embodiment of a method for operating a key-lock system by use of a key coded in a previous key coding interchange comprises the following steps:

(a) at step 400, storing in the key and in the lock a key identifier, a question code and answer code, at least such question code and such answer code having been originated in a previous key coding interchange between the key and the lock;

(b) at step 410, initiating an unlock sequence by transmitting the key identifier from the key to the lock;

(c) at step 420, transmitting the question code from the lock to the key, if the key identifier transmitted by the key in step 410 corresponds acceptably with the key identifier as stored in the lock;

(d) at step 430, transmitting the answer code from the key to the lock, if the question code transmitted by the lock in step 420 corresponds acceptably with the question code as stored in the key; and (e) at step 440, providing an unlock signal for controlling a locking device, if the answer code transmitted by the key in step 430 corresponds acceptably with the answer code as stored in the lock.

I claim:

1. A key, for use in a key-lock system in which an unlock sequence is controlled by stored question and answer codes previously originated by cooperative interchange between the key and the lock, comprising:

a transmitter for transmitting messages to said lock;

a receiver for receiving messages from said lock;

a key memory for storing data, including means for storing a key identifier, and for storing a question code and an answer code originated in a previous key coding interchange between said key and said lock; and data processing means, coupled to said transmitter, said receiver and said key memory:

(a) for retrieving said stored question code and said stored answer code, originated in said previous key coding interchange, from said key memory;

(b) for initiating an unlock sequence by causing a key-identification message, including said key identifier, to be coupled to said transmitter for transmission to said lock;

(c) for responding to a resulting question-to-answer message received from said lock, including a question code portion, to provide a comparison of said question code portion and said stored question code; and (d) for causing an answer-to-question message, including said stored answer code, responsive to said comparison to be coupled to said transmitter for transmission to said lock;

said data processing means, for purposes of key coding, additionally being arranged:

(e) for initiating a key coding operation by causing a key-identification message, including a key identifier retrieved from said key memory, to be coupled to said transmitter for transmission to said lock;

(f) for responding to a resulting question-to-store message received from said lock, including a question code, by causing said question code to be stored in said key memory and causing a first acknowledge message to be coupled to said transmitter for transmission to said lock; and (g) for responding to a subsequent answer-to-store message received from said lock, including an answer code, by causing said answer code to be stored in said key memory and causing a second acknowledge message to be coupled to said transmitter for transmission to said lock.

2. A key as in claim 1, wherein said data processing means includes a comparator, for comparing received question code portions to stored question codes and causing a question-conflict message to be coupled to said transmitter for transmission to said lock, in response to a conflict represented by prior storage of the identical question code.

3. A key as in claim 1, additionally comprising a read-only memory for storing a reference key identifier for use in resetting said key.

4. A key as in claim 1, wherein said key memory includes means for storing scrambling codes and said data processing means includes a unique-code generator for scrambling the answer code portion of messages to be transmitted, and a unique-code analyzer for descrambling the question code portion of messages received from said lock, using scrambling codes stored in said key memory.

5. A key as in claim 1, wherein said data processing means includes timing means for causing said key to be non-responsive to said question-to-answer message in a time period beginning a predetermined time after transmission of said key-identification message by said transmitter of said key to said lock, if no responsive question-to-answer message is received within said predetermined time.

6. A key as in claim 1, wherein said data processing means includes, as component elements utilized in implementation of the lettered functions (a)–(d) of said data processing means wherein each said message includes a class-code part and a unique-code part:

a class-code generator for generating class-code parts of messages to be sent;

a unique-code generator for generating answer code portions of messages to be sent;

a class-code analyzer for identifying class-code parts of messages received;

a unique-code analyzer for identifying question code portions of messages received;

a comparator for comparing question code portions of messages received to question codes stored in said key memory; and an algorithm processor for organizing the operation of said key in transmitting, receiving, analyzing, storing and other operations.

7. A lock, for use in a key-lock system in which an unlock sequence is controlled by stored question and answer codes previously originated by cooperative action between the key and the lock, comprising:

a receiver for receiving messages from said key;

a transmitter for transmitting messages to said key;

a lock memory for storing data, including means for storing a key identifier, and for storing a question code and an answer code originated in a previous key coding interchange between said key and said lock; and data processing means, coupled to said receiver, said transmitter and said lock memory:

(a) for retrieving said stored question code and said stored answer code, originated in said previous key coding interchange, from said lock memory;

(b) for responding to a key-identification message received from said key in initiating an unlock sequence, said message including a key-identifier portion, to provide a comparison of said key-identifier portion and said stored key identifier;

(c) for causing a question-to-answer message, including said stored question code, responsive to said comparison to be coupled to said transmitter for transmission to said lock;

(d) for responding to an answer-to-question message, including an answer code portion, to provide a comparison of said answer code portion and said stored answer code; and (e) for providing an unlock signal for controlling a locking device when said comparison establishes an acceptable correspondence between said answer code portion and said stored answer code;

said data processing means, for purposes of key coding, additionally being arranged:

(f) for responding during key coding to a key identification message received from said key, including a key-identifier, by confirming that said lock memory does not contain said key-identifier;

(g) for generating a question-to-store message, including a question code, and causing said question-to-store message to be coupled to said transmitter for transmission to and storage of said question code in said key;

(h) for responding to a first acknowledge message received from said key by generating an answer-to-store message, including an answer code, and causing said answer-to-store message to be coupled to said transmitter for transmission to and storage of said answer code in said key; and (i) for responding to a second acknowledge message received from said key by causing said question code, of said question-to-store message, and said answer code, of said answer-to-store message, to be stored in said lock memory and identified with said key.

8. A lock as in claim 7, wherein said data processing means causes key authority and parent data to be stored in said lock memory and identified with said key.

9. A lock as in claim 7, additionally including a data port interface means for enabling monitoring of the state of said lock and entry of control data into said lock.

10. A lock as in claim 7, wherein said lock memory includes means for storing scrambling codes and said data processing means includes a unique-code generator for scrambling the question code portion of messages to be transmitted, and a unique-code analyzer for descrambling the answer code portion of messages received from said lock, using scrambling codes stored in said lock memory.

11. A lock as in claim 7, wherein said data processing means includes timing means for providing, after activation by use of an authorized key, timed periods during which keys may be electronically coded, by storage of question and answer codes, for use with said lock or disabled to prevent further use with said lock.

12. A lock as in claim 7, wherein said data processing means includes, as component elements utilized in implementation of the lettered functions (a)–(d) of said data processing means wherein each said message includes a class-code part and a unique-code part:

a class-code generator for generating class-code parts of messages to be sent;

a unique-code generator for generating question code portions of messages to be sent;

a class-code analyzer for identifying class code parts of messages received;

a unique-code analyzer for identifying answer code portions of messages received;

a comparator for comparing answer code portions of messages received to answer codes stored in said lock memory; and an algorithm processor for organizing the operation of said lock in transmitting, receiving, analyzing, storing and other operations.

13. A key-lock system, including a lock as in claim 7 and a key comprising:

a transmitter for transmitting messages to said lock;

a receiver for receiving messages from said lock;

a key memory for storing data, including means for storing a key identifier, and for storing a question code and an answer code originated in a previous key coding interchange between said key and said lock; and data processing means, coupled to said transmitter, said receiver and said key memory:

(a) for retrieving said stored question code and said stored answer code, originated in said previous key coding interchange from said key memory;

(b) for initiating an unlock sequence by causing a key-identification message, including said key identifier, to be coupled to said transmitter for transmission to said lock;

(c) for responding to said resulting question-to-answer message received from said lock, including a question code portion, to provide a comparison of said question code portion and said stored question code; and (d) for causing an answer-to-question message, including said stored answer code, responsive to said comparison to be coupled to said transmitter for transmission to said lock.

14. A method for coding a key for use in a key-lock system, comprising the steps of:

(a) transmitting a key-identification message, including a key-identifier, from said key to said lock;

(b) generating and transmitting from said lock to said key a question-to-store message, including a question code;

(c) storing in said key said question code transmitted by said lock in step (b);

(d) transmitting from said key to said lock a first acknowledge message;

(e) generating and transmitting from said lock to said key an answer-to-store message, including an answer code;

(f) storing in said key said answer code transmitted by said lock in step (e);

(g) transmitting from said key to said lock a second acknowledge message; and (h) causing said question code and said answer code to be stored in said lock and identified with said key.

15. A method for operating a key-lock system by use of a key coded in a previous key coding interchange with a lock in accordance with claim 14, comprising the steps of:

(a) storing in said key and in said lock a key identifier, a question code and answer code, at least said question code and said answer code having been originated in said previous key coding interchange between said key and said lock;

(b) initiating an unlock sequence by transmitting said key identifier from said key to said lock;

(c) transmitting said question code from said lock to said key, if said key identifier transmitted by said key in step (b) corresponds acceptably with said key identifier as stored in said lock;

(d) transmitting said answer code from said key to said lock, if said question code transmitted by said lock in step (c) corresponds acceptably with said question code as stored in said key; and (e) providing an unlock signal for controlling a locking device, if said answer code transmitted by said key in step (d) corresponds acceptably with said answer code as stored in said lock.

16. A method for operating a key-lock system as in claim 15, additionally including steps for coding additional keys as follows:

(f) introducing a subsequent key into use with said lock during a period beginning after said unlock signal is provided in step (e) and ending at the expiration of a timed period; and (g) providing said question code and answer code to said subsequent key, if said key referred to in step (e) is authorized to initiate the coding of additional keys;

whereby, said subsequent key will be electronically coded by storage of said question code and said answer code.

* * * * *